United States Patent Office 3,652,516
Patented Mar. 28, 1972

3,652,516
POLYMERIZATION OF CONJUGATED DIENES OR MONOVINYL AROMATIC MONOMERS WITH MULTIFUNCTIONAL INITIATORS FROM DI-ISOPROPENYLBENZENE
Ralph C. Farrar, Bartlesville, Okla., assignor to Phillips Petroleum Company
No Drawing. Filed Feb. 10, 1969, Ser. No. 798,128
Int. Cl. C08f 7/04, 15/04; C08d 1/32
U.S. Cl. 260—83.7       7 Claims

ABSTRACT OF THE DISCLOSURE

Hydrocarbon soluble multifunctional polymerization initiators are produced by reacting diisopropenylbenzene compounds with organomonolithium compounds.

---

This invention relates to a multifunctional polymerization initiator prepared from diisopropenylbenzene compounds and organomonolithium compounds. In another aspect, it relates to a process for producing hydrocarbon soluble and stable polylithium initiators. In another aspect, it relates to an improved process for polymerizing conjugated dienes or monovinyl-substituted aromatic compounds and mixtures thereof.

Many dilithium polymerization initiators are well known to the art, but many of these known compounds are not soluble in hydrocarbons, often require a polar diluent for the preparation, and are not sufficiently stable that they can be prepared and stored for very long periods and still retain their activity. They must, therefore, often be prepared and used within a relatively short time.

It has now been discovered that by reacting an organomonolithium compound with a diisopropenylbenzene compound in the presence of a polymerizable monovinyl aromatic compound as a solubilizing monomer that a hydrocarbon soluble multifunctional polymerization initiator is produced.

It has been further discovered that a hydrocarbon soluble multifunctional polymerization initiator can be produced by reacting a diisopropenylbenzene compound and an organomonolithium compound and subsequently adding to the reaction product a solubilizing monomer of a polymerizable conjugated diene or polymerizable monovinyl-substituted aromatic compound.

It is an object of this invention to provide a process for preparing an improved multifunctional lithium based initiator. It is another object of this invention to provide a stable, hydrocarbon soluble initiator so as to enable easy storage thereof. Still another object is to provide a process using the initiator to polymerize monomers. Other objects, advantages, and features of my invention will be apparent to those skilled in the art from the following discussion and examples herein set forth.

According to the present invention, stable hydrocarbon soluble initiators containing at least two carbon-lithium bonds are readily prepared. The initiators are branched and the branches are terminated with lithium substituents which serve as reactive sites for the polymerization initiation. Branched polymers result when polymerizations are initiated with these multifunctional polymerization initiators.

According to one embodiment of the present invention, a diisopropenylbenzene compound is reacted with an organomonolithium compound in the presence of a monovinyl-substituted aromatic compound to produce a hydrocarbon soluble multifunctional polymerization initiator. In another embodiment of the present invention, diisopropenylbenzene and organomonolithium compounds are reacted together to form an insoluble multifunctional initiator which is subsequently solubilized by the addition of a solubilizing monomer of a conjugated diene or monovinyl-substituted aromatic compound, or mixtures thereof, to the reaction product to produce a hydrocarbon soluble multifunctional initiator. In another embodiment the organomonolithium compound and solubilizing monomer are reacted together and then the diisopropenylbenzene compound is reacted therewith to give a multifunctional initiator.

As hereinbefore stated, the present process provides a method for preparing multifunctional polymerization initiators from organomonolithium compounds and this process produces multifunctional initiators which are hydrocarbon soluble and stable and can be prepared in a hydrocarbon diluent. The diisopropenylbenzene compounds suitably employed according to this invention can be represented by the following formula:

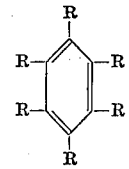

where two R's are isopropenyl radicals and each of the remaining R's is hydrogen, or an alkyl, or cycloalkyl radical, or combinations thereof, containing from 1 to 6 carbon atoms. Exemplary compounds are 1,2-diisopropenylbenzene;
1,3-diisopropenylbenzene;
1,4-diisopropenylbenzene;
3,4,5,6-tetramethyl-1,2-diisopropenylbenzene;
2,4,5,6-tetraethyl-1,3-diisopropenylbenzene;
2,3,5,6-tetra-n-hexyl-1,4-diisopropenylbenzene;
3,4-dicyclohexyl-1,2-diisopropenylbenzene;
5-(3-methylcyclopentyl)-1,3-diisopropenylbenzene;
3-cyclopentylmethyl-6-n-propyl-1,4-diisopropenylbenzene;
4-(2-cyclobutyl-1-ethyl)-1,2-diisopropenylbenzene;
3-(2-n-propylcyclopropyl)-1,4-diisopropenylbenzene;
2-methyl-5-n-hexyl-1,3-diisopropenylbenzene;
4-methyl-1,2-diisopropenylbenzene;
5-ethyl-1,3-diisopropenylbenzene;
3-methyl-1,4-diisopropenylbenzene;

and the like.

The organomonolithium compounds that are reacted with the diisopropenylbenzene compounds of this invention are represented by the formula R'Li; wherein R' is an aliphatic, cycloaliphatic, or aromatic radical, or combinations thereof, preferably containing from 2 to 20 carbon atoms per molecule. Exemplary of these organomonolithium compounds are ethyllithium, n-propyllithium, isopropyllithium, n-butyllithium, secondary-butyllithium, tert-octyllithium, n-decyllithium, n-eicosyllithium, phenyllithium, 2-naphthyllithium, 4-butylphenyllithium, 4-tolyllithium, 4-phenylbutyllithium, cyclohexyllithium, 3,5-di-n-heptylcyclohexyllithium, 4 - cyclopentylbutyllithium, and the like. The alkyllithium compounds are preferred for employment according to this invention, especially those wherein the alkyl group contains from 3 to 10 carbon atoms per molecule.

In a preferred embodiment the multifunctional polymerization initiators of my invention are prepared by reacting an organomonolithium compound with a diisopropenylbenzene compound using a mole ratio of diisopropenylbenzene to organomonolithium compound in the range of about 0.1:1 to 4:1, preferably 0.25:1 to 3:1, and conducting the reaction in the presence of a polymerizable monovinyl-substituted aromatic compound employed as a solubilizing monomer. The reaction is also conducted in the presence of a diluent which can be a hydrocarbon or polar compound, or mixtures thereof. While very efficient initiators can be prepared by employing only the aforementioned hydrocarbon or polar diluents, it is a preferred embodiment of my invention to react the organomonolithium compound and the diisopropenylbenzene compound in the presence of a solubilizing monomer of a monovinyl-substituted aromatic compound.

Polar diluents are of particular value for the production of polymers from conjugated dienes if a high vinyl content is desired as well as for preparing random copolymers of conjugated dienes and vinyl aromatic compounds. Exemplary polar compounds include ethers, thioethers, tertiary amines, and the like.

Hydrocarbon diluents including paraffins, cycloparaffins, and aromatics generally containing from 4 to 10 carbon atoms per molecule are suitable. Exemplary of some hydrocarbon diluents are benzene, toluene, xylene, cyclohexane, methylcyclohexane, n-butane, n-hexane, mixtures of these, and the like. The monovinyl-substituted aromatic compounds employed as solubilizing monomers according to the preferred embodiment of this invention are compounds such as styrene, or alkylated styrenes containing from 8 to 20 and preferably 8 to 12 carbon atoms per molecule. Exemplary are 3-methylstyrene, 3,5-diethylstyrene, 4-cyclohexylstyrene, 4-dodecylstyrene, and the like.

As hereinbefore stated, the reaction between diisopropenylbenzene and the organomonolithium compound can be conducted in a hydrocarbon or polar medium which will generally result in the formation of a precipitate. The precipitate however, can be solubilized as it is formed by conducting the reaction in the presence of a monovinyl-substituted aromatic compound employed as a solubilizing monomer. As a second method of operation, diisopropenylbenzene compound and an organomonolithium compound can be reacted first and a monovinyl-substituted aromatic compound or conjugated diene can be subsequently employed to solubilize the precipitated initiator. As a third method of operation the organomonolithium compound and the solubilizing monomer are contacted under the hereinafter described polymerization conditions. The product is then reacted with the diisopropenylbenzene compound within the temperature ranges of about −50 to 10° C., preferably −35° to 5° C. Those solubilizing monomers utilized for initiator preparation according to the second and third methods of operation are generally those conjugated dienes containing from 4 to 12 carbon atoms per molecule and preferably from 4 to 6 carbon atoms per molecule and monovinyl-substituted aromatic compounds such as styrene or alkylated styrenes containing from 8 to 20 carbon atoms and preferably 8 to 12 carbon atoms per molecule. Mixtures of these compounds can also be employed. Exemplary conjugated dienes are 1,3-butadiene; isoprene; piperylene; 1,3-hexadiene; 1,3-octadiene; 4,5-diethyl-1,3-octadiene; 2-methyl-3-isopropyl-1,3-butadiene, and the like.

However, if the reaction of the diisopropenylbenzene compound and the organomonolithium compound is conducted in the presence of a polymerizable conjugated diene in a manner analogous to the first method described above, no precipitate forms but the initiator is essentially monofunctional.

When the multifunctional polymerization initiators of this invention are prepared in the presence of a monovinyl-substituted aromatic compound as a solubilizing monomer, the compounds should be contacted within the broad temperature range of about −50° C. to 70° C. with a preferred range of −35° C. to 30° C.

When the isopropenylbenzene compound and organomonolithium compound are contacted in the absence of said monovinyl-substituted aromatic compound the temperatures employed should be in the ranges of about −50° C. to 10° C. with a preferred range of −35° C. to 5° C.

When the solubilizing monomer is added to the reaction product of the diisopropenylbenzene compound and the organomonolithium compound formed in the absence of said monovinyl-substituted aromatic compound the solubilizing monomer that is subsequently added is admixed with the reaction product within the broad temperature ranges of −50° C. to 120° C. with a preferred temperature range of −35° C. to 70° C.

As hereinbefore stated, the mole ratio of diisopropenylbenzene compound to organomonolithium compound is in the range of 0.1:1 to 4:1. A stoichiometric excess of diisopropenylbenzene compound is preferred.

The mole ratio of said monovinyl-substituted aromatic compound i.e., the solubilizing monomer, to said organomonolithium compound is from about 2:1 to 100:1, preferably 4:1 to 15:1.

If the solubilizing monomer is subsequently added to the reaction product of the diisopropenylbenzene compound and the organomonolithium compound or the organomonolithium and solubilizing monomer reacted first before the addition of the diisopropenylbenzene compound, the mole ratios of said solubilizing monomers of conjugated dienes or monovinyl-substituted aromatic compounds or mixtures thereof to organomonolithium compound is from about 2:1 to 100:1, preferably 4:1 to 15:1.

The particular time employed for each step of my invention will generally depend upon the temperature employed but would generally be in the range of about 5 seconds to 24 hours for each step. In many instances, a period of less than an hour for each step gives satisfactory results. It is to be understood that a longer reaction time would promote branching in the initiator but an excessive reaction period can lead to crosslinking, i.e., gel formation. If the initiator becomes gelled, the polymer initiated therefrom will contain gel. It is thus evident that for a given mole ratio of reactants, one skilled in the art can regulate temperature and time in order to obtain a gel-free branched initiator.

Polymers which can be prepared using the initiators of this invention are homopolymers made from conjugated dienes containing from 4 to 12, and preferably 4 to 8, carbon atoms per molecule; copolymers of 2 or more conjugated dienes; homopolymers made from monovinyl-substituted aromatic compounds containing 8 to 20 and preferably 8 to 12 carbon atoms per molecule; copolymers of 2 or more monovinyl-substituted aromatic compounds; and copolymers of conjugated dienes with monovinyl-substituted aromatic compounds. Homopolymers can range from low molecular weight liquids to solid polymers. Copolymers can be random or block copolymers. This invention provides a method for obtaining rubbery block copolymers of conjugated dienes and monovinyl-substituted aromatic compounds of high green tensile strength. Multiple blocks of polymerized monovinyl-substituted aromatic compounds are essential to obtaining polymers with high green tensile strength and can be produced according to this invention. Resinous block copolymers can be prepared when employing a predominant amount of monovinyl-substituted aromatic compound and a minor amount of conjugated diene. High impact resins with a high degree of clarity and other valuable properties can be prepared using the multifunctional initiators of this invention. When compounded with ingredients known in the art, the low molecular weight polymers can be used as plasticizers, caulking compounds, sealants, potting compounds, coating compounds, and the like; and the high molecular weight polymers have application in adhesive compositions, shoe soles, floor tile, tire tread, hose, belting, gaskets, and the like.

The amount of initiator used in the polymerization process depends upon the particular multifunctional polymerization initiator employed and the type of polymer desired. An effective initiator level is normally in the range of about 0.25 to 100, preferably 1 to 50, milliequivalents of lithium per 100 grams of monomer (mehm) to be polymerized.

The milliequivalents of lithium can be conveniently determined by an alkalinity titration of a known volume of the reaction mixture containing the multifunctional initiator. Said alkalinity titration employs standardized acid, e.g., HCl, and an indicator such as phenolphthalein to determine the end-point of titration. The alkaline normality thus obtained provides a value for the milliequivalents of lithium per milliliter of reaction mixture containing the multifunctional initiator. The alkalinity concentration (normality) thus determined is then employed for charging a known quantity of milliequivalents of lithium in polymerization recipes employing the multifunctional initiators of this invention.

Polymerization conditions generally known to the art can be suitably employed. It is preferred that the polymerization be conducted in the presence of a suitable diluent such as benzene, toluene, xylene, cyclohexane, methylcyclohexane, n-butane, n-hexane, n-heptane, isooctane, mixtures of these and the like. Generally, the diluent is selected from hydrocarbons, i.e., paraffins, cycloparaffins, and aromatics containing from 4 to 10 carbon atoms per molecule. The polymerization temperature can vary over a broad range, generally about —100 to 300° F., and is preferred to operate at temperatures of at least 85° F.

When a polymerization is conducted in the presence of the multifunctional initiators of this invention, the unquenched polymerization mixture has a branched structure and the branches contain terminal lithium atoms. Treatment with various agents such as carbon dioxide, epoxy compounds, and the like yield polymers with terminal functional groups on the several polymer branches that contain a terminal lithium atom. The polymers of this type can be treated easily to form a tight network by reaction with various multifunctional reagents. As an example, low molecular weight liquid polybutadiene containing multiple carboxy groups can be cured to a solid polymer with polyfunctional aziridinyl compound or a polyfunctional epoxy compound.

Illustrative of the foregoing discussion and not to be interpreted as a limitation on the materials herein employed or on the scope of my invention, the following examples are provided.

EXAMPLE I

Two runs weer conduced wherein secondary butyllithium and 1,4-di-isopropenylbenzene were reacted together to produce the polymerization initiator.

| Run | A | B |
|---|---|---|
| Toluene, milliliters | 55 | 55 |
| 1,4-diisopropenylbenzene, mmoles | 14 | 14 |
| Sec-butyllithium, mmoles | 10 | 10 |
| 1,3-butadiene, milliliters added initially | 2 | 0 |
| Diisopropenylbenzene:BuLi, mole ratio | 1.4:1 | 1.4:1 |
| Initial temperature, ° C | 5 | —32 |
| Initial time, hours | 16 | 16 |

In Run A, butadiene was charged to the mixture of diisopropenylbenzene and toluene and then the secondary-butyllithium was added as a 1.37 molar solution in cyclohexane. Charging was done at room temperature and the temperature then adjusted to the desired level. There was no evidence of reaction after 16 hours at the 5° C. temperature level. The temperature was then increased to 30° C. and maintained at this level for 6 hours. There was still no evidence of reaction so the temperature was increased to 50° C. and maintained at this level for 3 hours. The temperature was then lowered to —32° C. for storage. Titration with 0.1 N HCl gave a normality (based on alkalinity) of 0.140.

In Run B, no butadiene was added initially. The reaction occurred immediately and a precipitate formed. After 16 hours the temperature was increased to 0° C. and maintained at this level for 2 hours. Two milliliters of butadiene was then added and the mixture was agitated and warmed to 40° C. The initiator was solubilized as a result of this treatment. Titration with 0.1 N HCl gave an alkaline normality of 0.144.

Each of these initiators was then used for the copolymerization of butadiene with styrene. Prior to the termination of the polymerization, the reaction mixture was treated with stannic chloride. The recipe was as follows:

| | |
|---|---|
| 1,3-butadiene, parts by weight | 75 |
| Styrene, parts by weight | 25 |
| Cyclohexane, parts by weight | 760 |
| Tetrahydrofuran, parts by weight | 1.5 |
| Initiator, mehm.[1] | Variable |
| Temperature, ° C. | 70 |
| Time, minutes | [3] 20 or 30 |
| Stannic chloride, mhm.[2] | Variable |

[1] Gram milliequivalents lithium per 100 grams monomers.
[2] Gram millimoles per 100 grams monomers.
[3] Runs using initiator from Run A, 20 minutes; runs using initiator from Run B, 30 minutes.

In each run cyclohexane was charged first. The reactor was purged with nitrogen and butadiene was added, then the styrene, the tetrahydrofuran, and the initiator. At the conclusion of each polymerization, stannic chloride was added and after at least 10 minutes a 10 weight percent solution of the antioxidant, 2,2'-methylene-bis(4-methyl-6-tert-butylphenol), in a mixture of equal parts by volume of toluene and isopropyl alcohol, was added in an amount sufficient to provide one part by weight of the antioxidant per 100 parts by weight of the polymer. The polymer was coagulated in isopropyl alcohol and was separated and dried. One run was made with each initiator in which no stannic chloride was added. Random butadiene-styrene copolymers were obtained. Data are presented in Table I.

TABLE I

| Run No. | Initiator from Run | Initiator, mehm. | SnCl₄, mhm. | Conv., percent | ML-4[1] at 212° F. | Gel,[2] percent |
|---|---|---|---|---|---|---|
| 1 | A | 2.0 | 0 | 97.7 | 10 | 0 |
| 2 | A | 2.0 | 0.25 | 100 | 29 | 0 |
| 3 | A | 2.0 | 0.50 | 100 | 34 | 0 |
| 4 | B | 3.0 | 0 | 99.6 | 30 | 0 |
| 5 | B | 3.0 | 0.25 | 100 | 120 | 13 |
| 6 | B | 3.0 | 0.50 | 99 | ([3]) | 56 |

[1] (Mooney viscosity) ASTM D 1646-63.
[2] Determined according to the procedure of U.S. 3,278,508, col. 20, note b.
[3] Too high to measure.

In Runs 1–3 the results of the stannic chloride treatment are essentially those obtained from a mono-functional initiator such as butyllithium (a Mooney viscosity increase of generally around 28–35, and there was no gel formed as would be the case with a polyfunctional initiator). The initiator used for Runs 1–3 was prepared by reacting the diisopropenylbenzene with secondary butyllithium in the presence of butadiene. This resulted in an initiator that was essentially monofunctional.

In Runs 4–6 there was a much higher Mooney viscosity increase than in Runs 1–3, as a result of the stannic chloride treatment, and a considerable amount of gel was formed. Runs 4–6 in the above data thus demonstrate as evidenced by the high Mooney viscosity increase and gel formation, that the initiator used in these runs, produced in accordance with this invention, was multifunctional. It was prepared by reacting diisopropenylbenzene and secondary-butyllithium first and then solubilizing the reaction product by the addition of butadiene.

EXAMPLE II

Runs were made to demonstrate the effectiveness of styrene as a solubilizing monomer when preparing the multifunctional initiators at 5° C. by reacting diisopropenylbenzene and secondary butyllithium. The recipes were as follows:

| Run | C | D |
|---|---|---|
| Toluene, milliliters | 55 | 55 |
| 1,4-diisopropenylbenzene, mmoles | 7 | 28 |
| Sec-butyllithium, mmoles | 10 | 10 |
| Styrene, milliliters | 4.3 | 4.3 |
| Diisopropenylbenzene:BuLi, mole ratio | 0.7:1 | 2.8:1 |
| Temperature, °C | 5 | 5 |
| Time, hours | 25.5 | 4.5 |

Note.—The above materials were charged in the following order: Diisopropenylbenzene-toluene-nitrogen purge-styrene-adjust temperature to 5° C. secondary butyllithium.

In both Runs C and D the sec-butyllithium was added as a 1.37 molar solution in cyclohexane. It was cooled to 5° C. before being charged. Each reaction mixture was titrated with 0.1 N HCl and the normality for Run C was determined to be 0.155 and for Run D 0.142. Initiators were then used for the copolymerization of butadiene with styrene. The polymerization recipe was the same as that employed in Example I. Some of the reaction mixtures were treated with stannic chloride prior to termination. Control runs were made in which none of the tin compound was employed. The polymerization temperature was 70° C. and the polymerization time 20 minutes. The data obtained in the copolymerization of butadiene with styrene are presented in Table II. The polymers were random butadiene-styrene copolymers.

TABLE II

| Run No. | Initiator from Run | Initiator, mehm. | SnCl$_4$, mhm. | Conv., percent | ML-4 at 212° F. | Gel, percent |
|---|---|---|---|---|---|---|
| 1 | C | 1.75 | 0 | 100 | 21 | 0 |
| 2 | C | 1.75 | 0.44 | 100 | 146.5 | 30 |
| 3 | C | 2.50 | 0 | 100 | 6 | 0 |
| 4 | C | 2.50 | 0.62 | 100 | 90 | 17 |
| 5 | D | 4.0 | 0 | 98 | 14 | 0 |
| 6 | D | 4.0 | 1.00 | 100 | 74 | 35 |

The above example shows preparation of the multifunctional initiators of this invention and use as initiators for butadiene-styrene copolymerization. The increase in Mooney and the gel formation of the polymer as the result of treatment of the polymer with stannic chloride indicate that the initiators employed for preparing the polymers were multifunctional.

EXAMPLE III

Runs were made to demonstrate the effectiveness of styrene as a solubilizing monomer when preparing the multifunctional initiators at −34° C. by reacting diisopropenylbenzene and sec-butyllithium. The recipes were as follows:

| Run | E | F |
|---|---|---|
| Toluene, milliliters | 55 | 55 |
| 1,4-diisopropenylbenzene, mmoles | 14 | 20 |
| Sec-butyllithium, mmoles | 10 | 10 |
| Styrene, milliliters | 2.15 | 2.15 |
| Diisopropenylbenzene:BuLi mole ratio | 1.4:1 | 2:1 |
| Temperature, °C | −34 | −34 |
| Time, hours | 18 | 18 |

Diisopropenylbenzene was charged to the reactor first, followed by the addition of the toluene and a nitrogen purge. The styrene was added, the temperature adjusted to −34° C. and the sec-butyllithium added. In each run some insoluble material was present which was solubilized by the addition of 4 milliliters of butadiene at room temperature.

The initiators were then used for the copolymerization of butadiene with styrene. The polymerization recipe was the same as that employed in Example I. Some of the reaction mixtures were treated with dibutyldichlorotin prior to termination. Control runs were made in which none of the tin compound was employed. The polymerization temperature was 70° C. In runs using the initiator from Run E, the time was 20 minutes and when the initiator from Run F was used the time was 30 minutes. The data obtained in the copolymerization of butadiene with styrene is presented in Table III. The polymers were random butadiene-styrene copolymers.

TABLE III

| Run No. | Initiator from Run | Initiator, mehm. | Bu$_2$SnCl$_2$,[1] mhm. | Conv., percent | ML-4 at 212° F. | Gel, percent |
|---|---|---|---|---|---|---|
| 1 | E | 3.0 | 0 | 92.5 | 36 | 0 |
| 2 | E | 3.0 | 0.40 | 90.0 | 125 | 24 |
| 3 | E | 3.0 | 0.75 | 82.6 | 130 | 25 |
| 4 | E | 3.0 | 1.50 | 70.6 | 150 | 56 |
| 5 | F | 4.5 | 0 | 99 | 65 | 0 |
| 6 | F | 4.5 | 1.12 | 100 | 117.5 | 48 |
| 7 | F | 4.5 | 2.25 | 97.5 | 126.5 | 65 |

[1] Dibutyldichlorotin.

The Mooney increase and gel formation as a result of treatment of the polymer with dibutyldichlorotin indicate that the initiators employed for preparing the polymers were multifunctional.

EXAMPLE IV

The effect of charging 1,4-diisopropenylbenzene to a butadiene-styrene polymerization process using secondary butyllithium as the initiator was determined. The recipe was as follows:

| | |
|---|---|
| 1,3-butadiene, parts by weight | 75 |
| Styrene, parts by weight | 25 |
| Diisopropenylbenzene, mhm. | 2.8 |
| Cyclohexane, parts by weight | 760 |
| Tetrahydrofuran, parts by weight | 1.5 |
| sec-Butyllithium, mhm. | 1.4 |
| Diisopropenylbenzene:BuLi mole ratio | 2:1 |
| Temperature, °C. | 70 |
| Time, hours | 2 |
| Conversion, percent | 90 |
| ML-4 at 212° F. | 14 |

The Mooney value of the polymer recovered from the above run was 14. However, the initiator from Run 5 of Example III, prepared by reacting diisopropenylbenzene and secondary butyllithium in a 2:1 mole ratio prior to use in a polymerization process produced a polymer that had a Mooney value at ML-4 at 212° F. of 65 according to substantially an identical polymerization process as above. In this latter run, the initiator level was 4.5 milliequivalents of lithium per 100 grams of monomer instead of the 1.4 as in the above run. In spite of the high initiator level, branching was still produced because the initiator was multifunctional when the initiator was prepared according to this invention. These data show that the addition of the diisopropenylbenzene to the polymerization system of Example IV produced very little, if any, branching as indicated by the Mooney value.

As will be evident to those skilled in the art, various modifications of this invention can be made or followed, in light of the discussion and disclosure herein set forth, without departing from the scope and spirit thereof.

I claim:
1. A polymerization process comprising polymerizing at least one polymerizable monomer wherein said polymerizable monomer is a conjugated diene containing from 4 to 12 carbon atoms per molecule, monovinyl-substituted aromatic compound containing from 8 to 20 carbon atoms per molecule, or mixture thereof, under polymerization conditions and employing a hydrocarbon soluble multifunctional organolithium polymerization initiator in the range of about 0.25 to 100 milliequivalents of lithium per 100 grams of polymerizable monomer charged to said polymerization process,
 wherein said hydrocarbon soluble multifunctional polymerization initiator is the product of the reaction of an organomonolithium compound and a diisopropenylbenzene compound and is prepared by the process comprising:
  (I) reacting said organomonolithium compound with said diisopropenylbenzene compound, in the presence of a diluent which is hydrocarbon or polar compound or mixture thereof, and in the further presence of a monovinyl aromatic compound containing from 8 to 20 carbon atoms per molecule, wherein said reacting is conducted at a temperature within the range of about —50° C. to +70° C., and wherein is employed a ratio of said monovinyl-substituted aromatic compound to said organomonolithium compound of 2:1 to 100:1, or (IIa) reacting said organomonolithium compound with said diisopropenylbenzene compound, in the presence of diluent which is a hydrocarbon or polar compound or mixture thereof, and wherein said reacting of said step (IIa) is conducted at a temperature in the range of about —50° C. to +10° C.

(IIb) thereafter contacting the product of said step (IIa) with a solubilizing monomer, wherein said solubilizing monomer is said monovinyl aromatic compound, or a conjugated diene of 4 to 12 carbon atoms per molecule, or mixture thereof, and said contacting is conducted at a temperature of from —50° C. to +120° C., or (IIIa) reacting said organomonolithium compound with said solubilizing monomer and, (IIIb) thereafter contacting the product of said step (IIIa) with said diisopropenylbenzene compound, wherein said reacting with said diisopropenylbenzene compound is conducted at a temperature of from about —50° C. to +10° C., wherein is employed in said process (II) or said (III) a ratio of said solubilizing monomer of conjugated diene or monovinyl-substituted aromatic compound to said organomonolithium compound of from 2:1 to 100:1; and wherein in each of said processes (I), (II) or (III) is employed a mole ratio of said diisopropenylbenzene compound: said organomonolithium compound of 0.1:1 to 4:1.

2. The polymerization process according to claim 1 wherein said organomonolithium compound is represented by the formula R'Li wherein R' contains from 2 to 20 carbon atoms per molecule and is aliphatic, cycloaliphatic, or aromatic radical, and said diisopropenylbenzene compound is represented by the formula

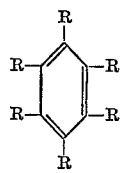

wherein two R radicals are isopropenyl radicals and each remaining R radical is hydrogen or is an alkyl or cycloalkyl radical or combination thereof, and contains from 1 to 6 carbon atoms per R radical;

wherein said hydrocarbon diluent is paraffin, cycloparaffin, or aromatic, and contains from 4 to 10 carbon atoms per molecule;

said polar diluent is ether, thioether, or tertiary amine.

3. The polymerization process according to claim 2 wherein said hydrocarbon soluble multifunctional polymerization initiator is employed in an amount sufficient to provide 1 to 50 milliequivalents of lithium contained in said initiator per 100 grams of monomer to be polymerized, and said polymerization process is conducted in a hydrocarbon diluent, said hydrocarbon diluent is a paraffin, cycloparaffin, or aromatic, contains from 4 to 10 carbon atoms per molecule, or mixture thereof, said polymerization is conducted at a temperature of from about —100 to +300° F.

4. The polymerization process according to claim 3 wherein said multifunctional initiator is the product of said process (II).

5. The polymerization process according to claim 4 wherein said organomonolithium compound R'Li is sec-butyllithium, said solubilizing monomer is 1,3-butadiene, said polymerizable monomer comprises styrene and 1,3-butadiene.

6. The polymerization process according to claim 3 wherein said multifunctional initiator is the product of process (I).

7. The polymerization process according to claim 6 wherein said organomonolithium compound R'Li is sec-butyllithium, said solubilizing monomer is styrene, said polymerizable monomer comprises butadiene and styrene.

References Cited
UNITED STATES PATENTS 3,280,084  10/1966  Zelinski et al. _____ 260—83.7

JAMES A. SEIDLECK, Primary Examiner

U.S. Cl. X.R.

252—431; 260—93.5 S, 94.2 M